United States Patent [19]

Hahn

[11] Patent Number: 4,865,458

[45] Date of Patent: Sep. 12, 1989

[54] APPARATUS FOR BLENDING GRANULES FOR A ROOFING PRODUCT

[75] Inventor: Patrick P. Hahn, Stone Mountain, Ga.

[73] Assignee: Georgia-Pacific Corporation, Atlanta, Ga.

[21] Appl. No.: 177,454

[22] Filed: Apr. 4, 1988

[51] Int. Cl.$^4$ .................. G05D 11/13; G05D 11/03; B05C 5/00

[52] U.S. Cl. .................. 366/160; 118/310; 222/44; 222/63; 222/504; 222/556

[58] Field of Search .............. 366/8, 16, 19, 21, 160, 366/162, 219, 181, 182, 183; 222/63, 71, 504, 505, 556, 559, 560, 561, 41, 43, 44, 1, 460, 462, 502, 503, 544, 545, 558, 481, 482, 481.5; 364/479, 468, 469; 251/129.11, 129.12, 208, 300, 77, 299, 205, 301, 303; 74/89.15, 424.8 A; 118/301, 308, 310, 313, 314, 315, 325

[56] References Cited

U.S. PATENT DOCUMENTS

| 1,324,508 | 12/1919 | Leopold | 222/43 X |
|---|---|---|---|
| 1,448,203 | 3/1923 | Cumfer et al. | 118/301 |
| 1,598,990 | 9/1926 | Sikes | 222/556 |
| 1,654,050 | 12/1927 | Page | 222/557 |
| 1,907,773 | 5/1933 | Fisher et al. | 222/560 |
| 2,049,998 | 8/1936 | Elliot et al. | 222/556 X |
| 2,200,773 | 5/1940 | Finne | 222/41 X |
| 2,510,231 | 6/1950 | Juzwiak | 222/43 X |
| 2,526,081 | 10/1950 | Meincke | 222/44 X |
| 2,679,335 | 5/1954 | Bell | 222/503 X |
| 2,830,746 | 4/1958 | Sweet | 222/556 X |
| 2,830,746 | 4/1958 | Sweet | 222/556 X |
| 2,905,569 | 9/1959 | Zitke | 118/301 X |
| 3,191,944 | 6/1965 | Watts | 222/505 X |
| 3,757,591 | 9/1973 | Taylor | 74/89.15 |

FOREIGN PATENT DOCUMENTS

1032916 6/1958 Fed. Rep. of Germany.

Primary Examiner—Harvey C. Hornsby
Assistant Examiner—Scott J. Haugland
Attorney, Agent, or Firm—Banner, Birch, McKie & Beckett

[57] ABSTRACT

Apparatus for mixing granules of different colors for use in surfacing for example asphalt shingles in which the valve opening is controlled automatically, the valve being opened by a drive having a fixed valve opening travel and the different valve open positions being determined by intially presetting the valve opening drive by operating it a predetermined amount from a home position in the direction opposite from the valve opening direction, reversing the drive motor to return it to the home position while recording the motion as a part of the fixed valve opening motion, and reenergizing the drive to complete the valve opening motion. The apparatus is also adapted to be operated manually in the event of a malfunction or power failure and it is provided with diamond-shaped orifices whereby the valve opening is a function of the square of the percent of valve travel to provide more accurate control in the low valve opening ranges.

18 Claims, 9 Drawing Sheets

APPARATUS FOR BLENDING GRANULES FOR A ROOFING PRODUCT

This invention relates to apparatus for automatically mixing and blending colored mineral granules that are used for example to surface roofing products such as asphalt shingles, and for providing back-up manual operation in the event of power failure or other malfunction.

BACKGROUND OF THE INVENTION

Asphalt shingles are normally finished with colored granules of mineral material that are deposited by gravity on the tacky surface of a continuous belt of roofing material, the granules being deposited in for example four different drops and a backfall to fill in the voids between the granule patterns from the four drops that give the shingles their color characteristics. Each of the drops and the backfall consist of a different mix, each of which mixes may consist of different percentages of granules of up to five different colors. The present invention relates to apparatus for preparing such mixes.

Mixes of granules have generally been prepared by metering the granules by gravity from individual silos each containing a selected color onto a moving mixing belt. Normally, each silo is fitted with a calibrated orifice plate that, when moved to its opened position, will provide an orifice of the size required to provide the desired flow rate for the granules from the silo onto the mixing belt. Systems of this nature have been operated manually whereby, after all of the selected silos for a particular mix have been fitted with the appropriate orifice plates, and after the belt has been operated for a period of time sufficient to purge the system of granules from a previous mix that would contaminate the current mix, the operator moves the orifice plate to open the outlet of the first silo to be used in the mix. Then, walking along with the belt at the speed of the belt, the operator successively opens the outlets of the other selected silos in the same manner—each of the outlets being opened as the point on the belt at which the mix begins, that is, the point that was directly below the outlet of the first silo when the outlet of that silo was opened, passes successively beneath the outlets of the other silos. The mix is delivered by the mixing belt to a bin from which it is later deposited by a blending apparatus onto a belt of asphalt material from which the shingles are cut.

Pneumatic systems have been proposed in which an operator at a central location can control the flow of the granules from the silos. These systems, which may generally parallel the manual system but with preselected orifice plates or valves opened and closed by air cylinders or with the amount of the valve opening controlled by air cylinders, have not been found to be satisfactory. Relatively minor variations in the flow rate of the colors in the mix can produce noticeable variations in the product—which results in waste or customer complaints. In addition to being subject to operator error, it is difficult to maintain pneumatic systems and to correct malfunctions due to wet or dirty air that can clog or freeze the air lines or require recalibration of the instruments.

SUMMARY OF THE INVENTION

The objects of the present invention are to provide an apparatus for automatically mixing granules to produce different color mixes for use in surfacing asphalt roofing products and particularly to provide such an apparatus that will accurately and efficiently produce the desired color mixes, is subject to a minimum of operator error, is reasonably free from maintenance and service requirements, and is capable of being operated manually in the event of a malfunction or power failure.

Further objects of the invention will be apparent from an understanding of the invention as herein described which comprises a valve mechanism at the outlet of each silo that holds the colored granules and from which they are dropped onto the mixing belt. Each of the valve mechanisms comprises a diamond-shaped valve opening or outlet in a moveable orifice plate that mates with a comparably shaped stationary orifice. The orifice plate is adapted to be moved relative to the stationary orifice so that as the orifices overlap, there is provided an increasing valve opening that in turn provides a metered flow of the granules. The movement of the orifice plate is controlled by a controller programmed to provide the valve opening required for the desired flow rate of the granules from each silo used in the mix.

The valve is actuated by a single motor that is reversible to preset the valve in the direction opposite from its opening direction as well as to drive the valve in its opening movement—which is a fixed or constant value, such as 120°, regardless of the amount that the valve is to be opened. Variations in the valve opening are provided by the amount of presetting motion which determines the point at which the valve opening motion begins. After the presetting motion, the motor is driven forwardly to its original home position, which is determined by a home switch. Thus each of the valves of the silos used in the mix is in position to begin opening and dropping granules on the belt at the same point on the belt.

DETAILED DESCRIPTION

Figure 1:
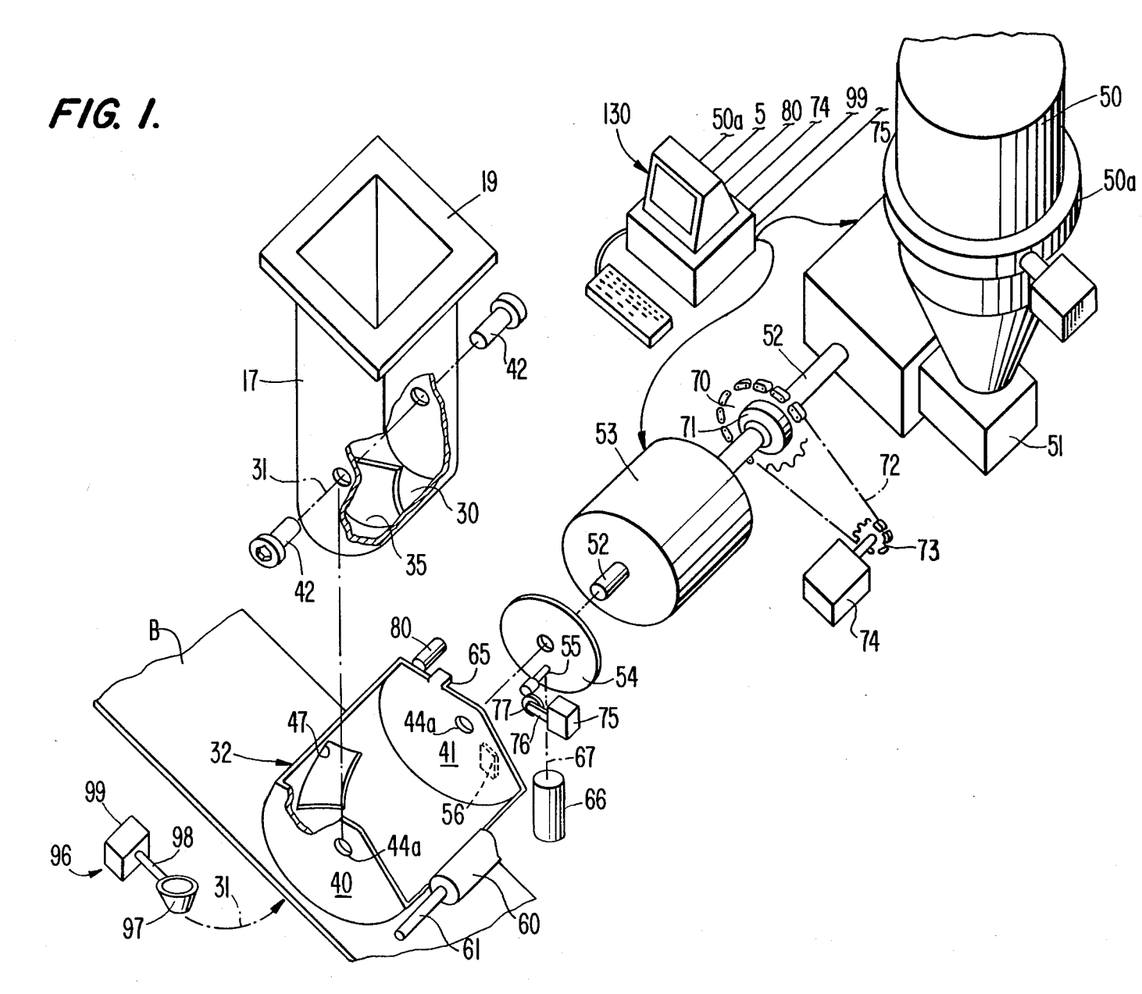
FIG. 1 is a sketch showing schematically an exploded perspective view of the valve operating mechanism of an apparatus in accordance with the present invention.

The apparatus illustrated in the drawings comprises a frame 10 (FIG. 2) having a strap 12 at the end of an arm 11 and receiving a supporting pipe 13 for supporting the frame 10 over a mixing belt B illustrated schematically in FIG. 1. The frame 10 is secured to the pipe 13 by bolts 14 for adjustment of the frame 10 vertically relative to the belt B.

Extending in the opposite direction from the arm 11 of the frame 10 is an arm 15 secured by bolts 16 to a valve body 17 that is substantially square in cross section and through which the granules are dispensed. To maintain alignment between the frame 10 and the valve body 17, a pair of pins 18 are placed in holes drilled in the arm 15 and the side walls of the valve body after they have been accurately aligned.

At its upper end, the valve body 17 has a flange 19 secured as by bolts 20 to a flange 21 at the lower end of a transition piece 22 (FIG. 3) that, in turn, has a pair of spaced flanges 23 and 24 (FIGS. 3 and 4) at its upper end between which is disposed a fastening collar 25 for securing the transition piece 22 as by bolts 26 to a flange 27 at the outlet of a conventional silo or hopper 28 that holds the granules to be dispensed.

The valve body 17 is open through the transition piece 22 to the output opening of the hopper 28 so that granules in the hopper normally flow through the transition piece 22 into and fill the valve body 17.

At its lower end, the valve body 17 is provided with a bottom plate 30 (FIGS. 1 and 3) that serves as an inner valve member. The bottom plate 30 is arcuate about a transverse axis 31 located laterally of the side walls of the valve body 17 at substantially the midpoint thereof and spaced upwardly from the bottom plate 30. The axis 31 also serves as the pivot axis of a valve gate 32 that serves as the moveable valve member. The bottom plate 30 is secured in position to close the bottom of the valve body 17 by, for example, welding at the front and back walls of the valve body 17 to bars 33 and 34 (FIG. 3), respectively, which are adapted to be secured as by bolts 30a to the side walls of the valve body 17 to provide for readily replacing the plate 30 as required because of wear caused by abrasion by the granules. The bottom edge of the side walls of the valve body 17 are contoured to conform to the curvature of the arcuate bottom plate 30 and the plate 30 is provided with a diamond-shaped opening or orifice 35 (FIG. 1).

The moveable valve gate 32 comprises a pair of side walls 40 and 41 they are pivotally mounted on the side walls of the valve body 17 on the axis 31 by pivot studs 42 (FIG. 4) in the form of shoulder screws threaded into supports 43 secured as by welding to the inside of the side walls of the valve body 17—the supports 43 being formed to provide a minimum of interference with the flow of granules downwardly through the valve body 17.

The side walls 40 and 41 of the valve gate 32 are mounted on bushings 44 that are received in apertures 44a therein and are secured between the heads of the pivot studs 42 and the hub portion of the support 43—the side walls 40 and 41 being provided with washers 45 to provide support on the bushings 44 and are held against movement endwise of the busing 44 by snap ring 45a. The side walls 40 and 41 of the valve gate 32 are formed as sectors of the circle with an arc of approximately 100° and have bottom edges on a arc about the pivot axis 31. The bottom edges of the side walls 40 and 41 thus conform to the configuration of the bottom plate 30 of the valve body 17 and extend slightly beyond the bottom plate 30. The valve gate 32 is also provided with a bottom or valve plate 46 that is secured to the bottom edges of the side walls 40 and 41 as by welding and spaced uniformly from the bottom plate 30 a distance that is sufficient to provide for movement of the valve gate 32 relative to the bottom plate 30 about the pivot axis 31.

Figure 3:
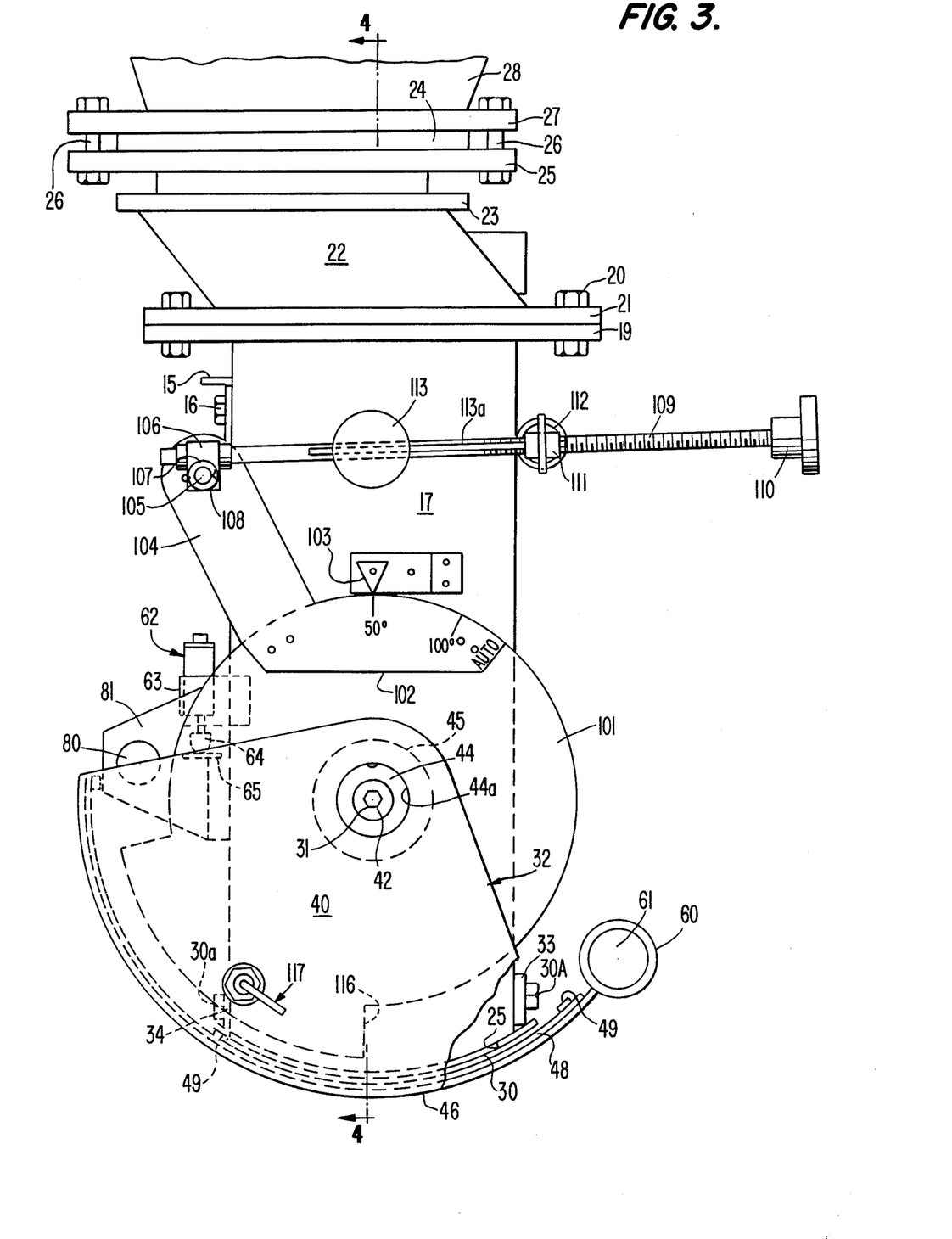
FIG. 3 is a side elevational view of the apparatus of FIG. 2, also with parts broken away.
Figure 4:
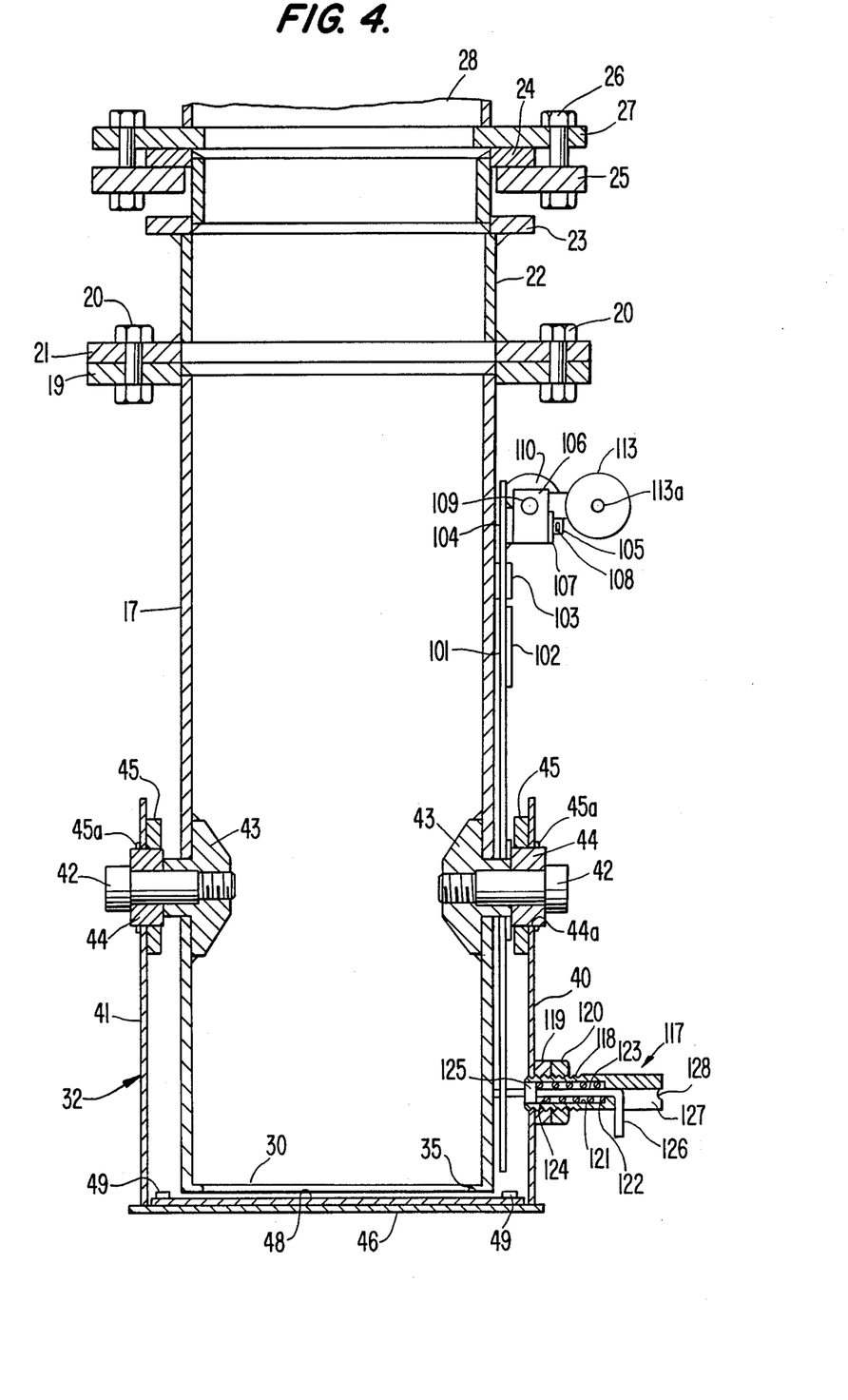
FIG. 4 is a sectional view substantially on the line 4—4 of FIG. 3.

The valve plate 46 is also provided with a diamond-shaped opening 47 (FIG. 1) matching the size and configuration of the opening 35 in the bottom plate 30 of the valve body 17, and adapted to mate with the opening 35 as the valve gate 32 swings about the axis 31. As shown in FIGS. 3 and 4, the bottom plate 46 may be formed with a wear plate 48 in which the opening 47 is formed—the wear plate being secured to the bottom plate 46 by screw 49 so that, like the bottom plate 30, it can be readily replaced as required because of wear due to abrasion by the granules.

The diamond-shaped opening 47 of the moveable valve gate 32 is adapted to be moved relative to the stationary diamond-shaped opening 35 of the valve body 17 as the valve gate 32 is swung about the axis 31 to open and close the outlet for the granules from the valve body 17 in a graduated manner depending on the overlap between the two diamond-shaped openings.

For moving the valve gate 32 there is provided a reversible electric motor 50 mounted on a horizontal plate 10a of the frame 10 and having a magnetic pickup 50a for counting increments of rotations. The motor 50 drives through a double reduction worm gear unit 51 a shaft 52 aligned endwise with the axis 31. An electric clutch 53, which is enclosed by a cover member 53a (FIG. 2) and also mounted on the horizontal plate 10a, is driven by the shaft 52 and, when energized, is adapted to drive a crank disc 54 keyed to the shaft 52 and carrying a hardened drive pin 55 at a point displaced from the axis 31. The pin 55 is adapted to engage a hardened push block 56 that is mounted on the side wall 41 of the valve gate 32 and is disposed from the axis 31 at a distance corresponding to the spacing of the pin 55 radially of the axis 31 so that the pin 55 engages the push bar 56 in driving relations upon movement of the pin 55 relative to the valve gate 32. Thus, upon rotation of the crank disc 54 in a counterclockwise direction as seen in FIG. 1 the pin 55 engages the block 56 and thus moves the block 56 together with the valve gate 32 in a counterclockwise direction. The valve gate 32 is returned to its neutral position by the counterweight 60 (FIG. 3) which also serves as a support for the handle 61.

The neutral position of the valve gate 32 is determined by a stop 62 (FIGS. 2 and 3) in the form of a resilient abutment that also serves as a shock absorber. The stop 62 is carried by a bracket 63 secured to the side wall of the valve body 17 and includes a head 64 that is formed for example of rubber and is disposed to be engaged by the tab 65 on the top of the side wall 41 of the valve gate 32.

Figure 2:
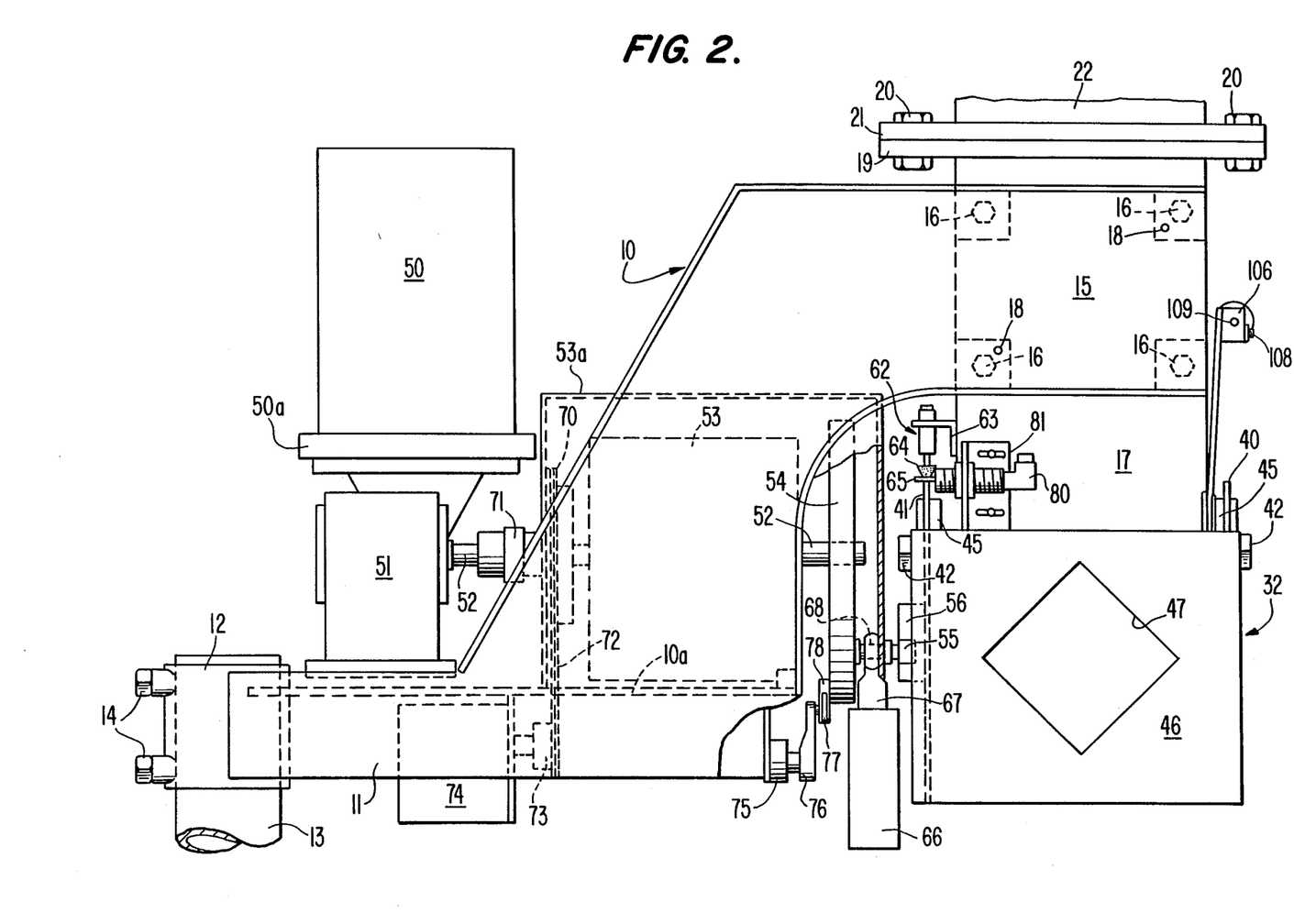
FIG. 2 is an elevational view from the back of the apparatus of FIG. 1 with parts broken away.

The crank disc 54 is also biased into a neutral or home position by a counterweight 66 depending from a link 67 mounted on the shank of the crank pin 55, as by a swivel connection 68 (FIG. 2). The crank disc 54 may also be provided with a detent mechanism (not shown) to force it into and to secure it in its home position and to prevent oscillation of the disc 54 at the end of its return stroke to the home position.

A sprocket 70 is mounted on the shaft 52 between the worm gear unit 51 and the clutch 53 and is coupled to the shaft 52 by a one way clutch 71 so that the sprocket 70 rotates with the shaft 52 in the counterclockwise direction as seen in FIG. 1, which is the direction in which the pin 55 moves against and drives the push block 56 to open the valve gate 32, but remains at rest when the shaft 52 is rotated in the opposite or clockwise direction.

A chain 72 is entrained about the sprocket 70 and about a sprocket 73 of a one-revolution rotary switch 74 mounted on the underside of the plate 10a. The sprocket 73 has for example twenty teeth while the sprocket 70 has sixty teeth whereby the sprocket 73 will be rotated one full revolution upon each 120° of rotation of the shaft 52. The switch 74 is in the circuit of the motor 50 and acts to deenergize the motor after one complete revolution of the sprocket 73 and thus after 120° of rotation of the shaft 52.

There is also provided a home switch 75 mounted on the plate 10a and having an actuating arm 76 carrying a roller 77 adapted to cooperate with an abutment 78 (FIG. 2) on the crank disc 54. The switch 75 is positioned on the plate 10a so that the roller 77 is engaged by the abutment 78 and thus opened when the crank disc 54 is rotated to its rest position by the counterweight 66. The switch 75 is thus opened in the normally closed position of the valve gate 32 relative to the bottom plate 30 of the valve body 17.

A proximity switch 80 is mounted on the side wall of the valve body 17 by a bracket 81 for adjustment of the position of the proximity switch 80 relative to the side wall 41 of the valve gate 32. The switch 80 senses the presence of the valve gate 32 when it's in its neutral or closed position with the tab 65 in engagement with the head 64 of the stop 62.

Figure 7:
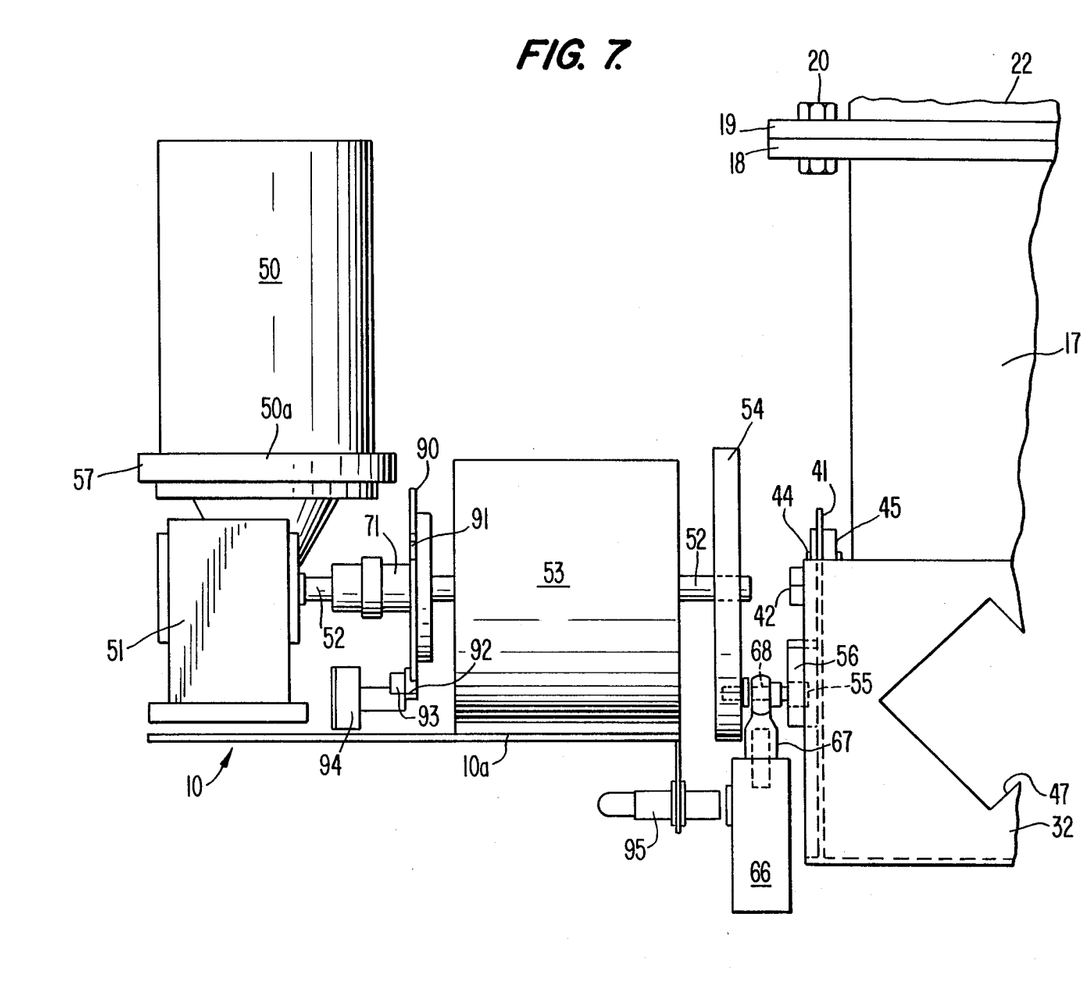
FIG. 7 is a fragmentary view similar to FIG. 2 illustrating a modification of the invention.
Figure 8:
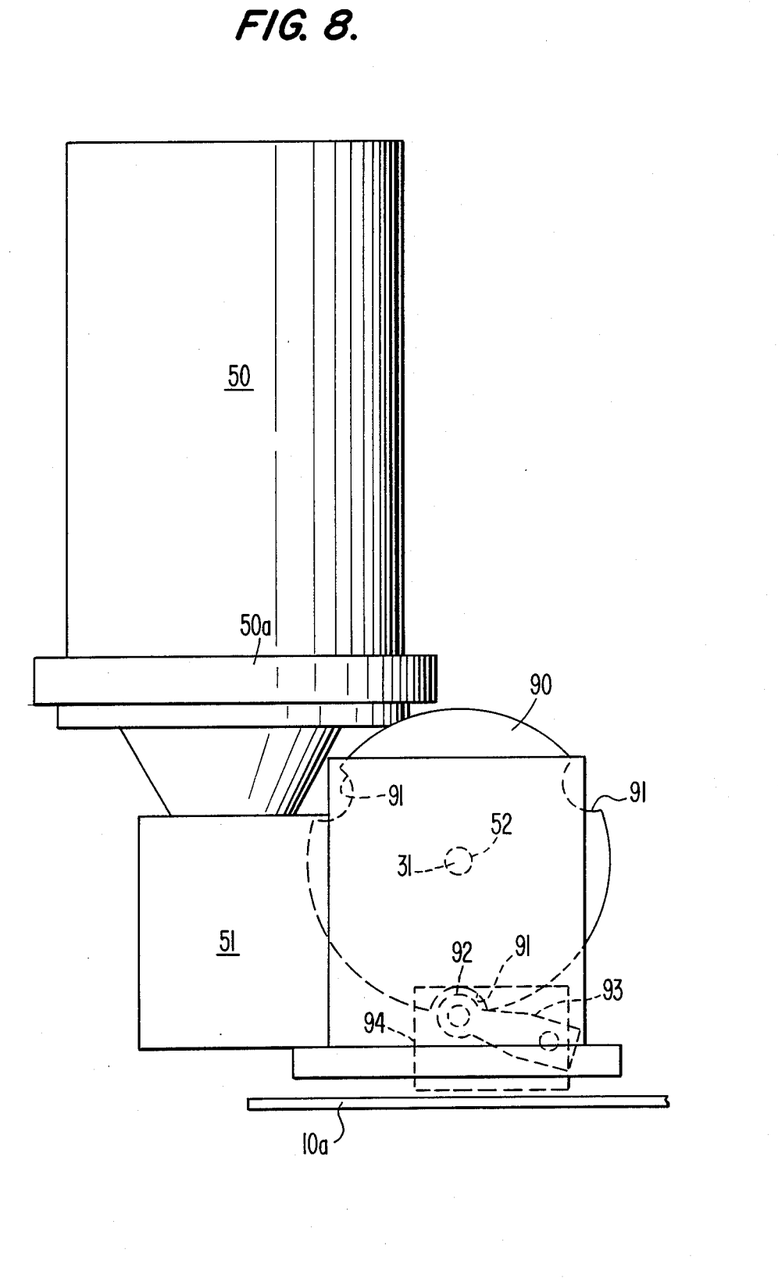
FIG. 8 is a fragmentary end view of the apparatus of FIG. 7.

In FIGS. 7 and 8 there is shown an alternative design for limiting rotation of the shaft 52 to 120°. In place of the sprockets 70 and 73 with the interconnecting chain 72 and the one-revolution switch 74, there is shown in FIGS. 7 and 8 a cam disc 90 having three cam depressions 91 in the periphery thereof that are spaced at interval of 120° about the disc. The cam disc is also adapted to be driven by the one-way clutch 71 and is tracked by a roller 92 journaled on the end of an arm 93 of a switch 94.

In FIG. 7 there is also illustrated a modification comprising a proximity switch 95 in lieu of the roller switch 75 to indicate when the crank disc 54 is in the home position. The proximity switch as shown is mounted on the frame 10 and is adapted to respond for example to the counterweight 66 when it has moved the cam disc 54 to the home position.

Figure 5:
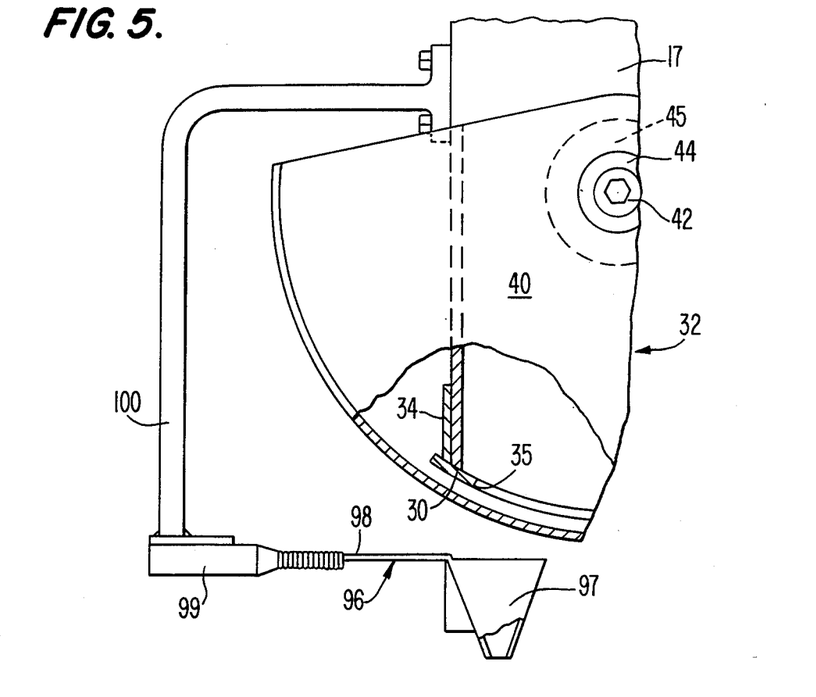
FIG. 5 is a fragmentary elevational view of a portion of the apparatus of FIG. 2 showing a flow control switch.
Figure 6:
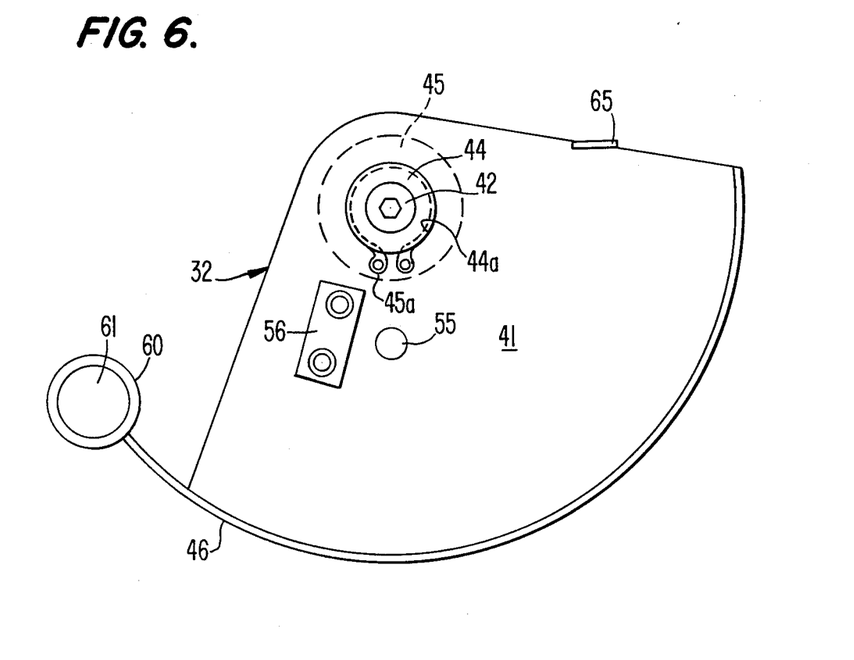
FIG. 6 is an end view of the moveable valve gate per se.

A flow sensor 96 (FIG. 5) is provided to indicate a malfunction when the flow of granules from the openings 35, 47 is interrupted as when the supply of granules in the silo 28 is exhausted or when the flow is stopped by an obstruction that closes the opening, or when the granules freeze. The flow sensor 96 comprises a funnel-shaped receiver 97 supported on an arm 98 that positions the receiver in the path of the granules flowing from the openings or more particularly beneath the leading edge of the opening 35—which is the point at which the openings 35 and 47 initially overlap upon movement of the valve gate 32 in the valve opening direction and begins to open the valve. The arm 98 extends from a microswitch 99 that is carried by the end of an arm 100 secured to the side wall of the valve body 17 and is adapted to be opened and closed by the weight of granules in the receiver 97.

Being open at the bottom, granules continuously flow from the receiver 97 and are replenished by granules falling from the openings 35 and 47 into the top of the receiver 97. So long as the granules continue to flow from the openings 35, 47 into the receiver at a rate that is faster than the rate at which they flow from the output at the bottom of the receiver—which is ensured in normal operation by providing an inlet end at the top that is larger than the outlet at the bottom—the receiver 97 remains full of granules and the microswitch 99 remains closed. When the flow of granules into the receiver 97 stops for any reason, the receiver is emptied and the switch 99 opens to deenergize the clutch 53 and thus permit the valve gate 32 to move to its closed position. As mentioned, the valve gate 32 is normally urged to its closed position by the counterweight 60—that is, in the clockwise direction as seen in FIG. 1—in which the tab 65 on the side wall 41 engages the head 64 of the stop 62.

Rather than the funnel-shape flow sensor 96, a plate-like flow sensor could also be used in which the granules fall onto a plate with the force of the granules causing the plate to pivot and thus to actuate a microswitch. In addition to the fact that a flow sensor of this nature can be used to detect extremely small flow rates, it also cannot be plugged as a funnel-like flow sensor could be if foreign matter of relatively large diameter finds its way into the silo and the surface of the plate against which the granules impinge can be coated with a wear resistance surface, such as a ceramic tile, to prevent abrasion by the granules.

As herein disclosed, the shaft 52 is rotated 120°—one third of a revolution—as determined by the switch 74 (FIGS. 1 and 2) or switch 94 (FIG. 7) in each cycle in which the valve gate 32 is opened regardless of the extent to which it is to be opened. More particularly, the orifices 35 and 47 are designed to encompass an arc of 52°. At the same time, there is provided clearance between the drive pin 55 and the push block 56 and an overlap between the leading edge of the orifice 47 and the trailing edge of the orifice 35 to prevent leakage of the granules when the valve is closed. The clearance and overlap may be for example 11° and 9° respectively so that the drive pin 55 must move through an arc of 20° from its home position in the valve opening direction before the valve begin to open and must move through an additional arc of 52° to open the valve completely—a total of 72° from the home position—while the valve gate 32 moves a total of 61° (52° plus 9°).

With a fixed valve opening motion of 120°, for a valve opening of 100% the drive pin 55 is first moved in the direction away from the push block 56 a total of 48° and is then advanced a total of 48° back to its home position. At that time the switch 74 or 94 has recorded a valve opening movement of 48° so that, upon reenergization of the motor 50, the switch will be opened upon a further advance of 72° to deenergize the motor 50 as the valve gate 32 becomes fully opened.

For a desired opening of zero, the drive pin 55 is first rotated 100° away from the push block and then returned 100° to its home position. Thus, when the motor 50 is renergized, it will rotate a total of only 20° before actuating the switch 74 or 94—which is sufficient only to take up the clearance and the overlap. The motor 50 is thus deenergized before the gate valve 32 begins to open.

For a desired valve opening representing 50% of valve travel, the drive pin 55 is first rotated 74° away from the push block 56 and then returned 74° to its home position. When the motor 50 is again energized, it will then rotate a total of 46° before the switch 74 or 94 is opened to deenergize the same—the first 20° serving to take up the clearance and the overlap and the next 26° serving to rotate the gate valve 32 50% of the total arc of 52°.

In all cases, regardless of how far the valve gate 32 is to be opened, it begins to open at 20° of rotation of the drive pin 55 from the home position upon reenergization of the motor 50.

In each mixing cycle, the drive motor 50 is energized at "power up" until it is deenergized by the switch 74 or 94 in order to set the switch. At the same time, the proximity switch 80 of all of the silos are read to be sure that all of the valves are properly closed, and the mixing belt is operated for a period of time long enough to be sure that the granules from the previous mix have been purged from the system. Then, upon selecting the desired mix, the controller determines from a look-up table the silos containing the granules for that mix and the setting of the valve gate 32 as a percent of valve travel for each. For each of the valve gates 32 of the selected silos, the controller then actuate in sequence the clutch 53 and the motor 50 to preset the drive 55 in the clockwise direction in FIG. 1—the direction opposite from the valve opening direction—by an amount determined by the valve open position ultimately desired. The same counter in the controller is used for all of the valve gates that are preset. During this rotation the sprocket 70 of the switch 74 or the cam disc 90 of the switch 94 remains stationary because of the one-way clutch 71.

Upon reaching the preset position—which is determined by the magnetic pickup 50a on the motor 50 that counts the increments of motion as, for example, 200 counts per degree of rotation—the motor 50 is reversed while the clutch 53 remains energized and the drive pin 55 is returned counterclockwise in FIG. 1 to its home position. Upon reaching the home position, the home switch 75 or 95 is opened to deenergize the motor 50—which, through use of the home switch, does not require counting and can proceed simultaneously for all of the selected valve gates 32. During this advance of the drive pin 55, the sprocket 70 of the switch 74 or the cam disc 90 of the switch 94 is advanced with the drive pin 55 to record a portion of the 120° of valve opening movement.

The apparatus is now in a "ready" position with the clutch 53 energized and the valve gate 32 in position to begin opening upon 20° of rotation of the drive pin 55, that is, after the drive pin 55 is advanced to take up the clearance between the pins 55 and the push block 56 and the overlap between the trailing point of the orifice 35 in the bottom plate 30 and the leading point of the orifice 47 in the valve gate 32. The valve will thus always begin to open at the same time regardless of the amount that it is ultimately to be opened— thus ensuring that the granules from the different silos used in the mix will begin falling at the same point onto the mixing belt.

The apparatus remains in the ready position until a valve opening signal is received from the mixing belt B. At that time, the motor is again energized and operates to advance the drive pin 55 in the direction to open the valve until the switch 74 or 94 records completion of the 120° of rotation and is opened to deenergize the motor 50. The amount that the valve is opened depends on the amount that it was preset—the amount that the drive pin 55 was advanced to return its from preset to its home position, which is thus counted as a part of the fixed opening cycle of 120° controlled by the home switch 74 or 94. The more that it was preset, the less it will be opened.

When the motor 50 is deenergized by the switch 74 or 94 the clutch 53 remains energized. Because of its irreversible nature, the double reduction worm gear unit 51 acts as a brake to hold the moveable valve gate 32 in its open position against the bias of the of counterweight 60. The valve gate 32 thus remains in its open position until the clutch 53 is deenergized, which may be manually or by a timer at the completion of a run, or by sensors such as the flow control switch 99 which senses termination of the flow of granules from a silo for example because the supply is exhausted or there is an obstruction to the flow. The clutch 53 also of course is deenergized in the event of malfunction such as a power failure or loss of signal from the controller.

Upon deenergizing the clutch 53 the drive disc 54 is released and is returned by the counterweight 66 to its home position. As the drive pin 55 moves away from the push block 56 the valve gate 32 is returned by the counterweight 60 to its closed position in which the tab 65 abuts the stop 62. The apparatus is now in its neutral position. For a normal termination of the mixing cycle, either manually or by the timer, the valves are closed in the same sequence as when opened in order to ensure proper mix to the end of the run, that is, the valve of the first silo in the mix—the one that was opened first—is first closed. Then, as the end of the drop from the first silo is directly beneath the valve of the second silo, the valve of the second silo is closed—which continues until all of the valves are closed. In an emergency shutdown, all of the valves are closed simultaneously and the mix on the mixing belt is diverted to scrap and, at the same time, an alarm is sounded.

The apparatus is also provided with means for emergency manual operation in the event of a power failure or failure of the programmed controller. As shown in FIGS. 3 and 4 this means comprises a cam plate 101 disposed between the side wall of the valve body 17 and the side wall 40 of the moveable valve gate 32 and is journaled for rotation on the hub portion of the support 43. An indicator plate 102 (FIG. 3) on the cam plate 101 cooperates with the pointer 103 on the side wall of the valve body 17 to indicate the valve opening as a percent of valve travel between the closed and full-opened positions—the cam plate 101 having indicia indicating the range of 0 to 100%.

The cam plate 101 is rotated on the hub of the support 43 by the crank arm 104 extending radially from the plate 101 and having a lateral stud 105 adjacent the free end. A connector 106 is mounted on the stud 105 for rotation, the connector being held on the stud for example by a washer 107 and a cotter pin 108 inserted through an opening in the free end of the stud. A threaded rod 109 has its one end secured in the connector 106 and has a handle 110 secured at the other or free end. Between its end, the rod 109 extends through an adjusting nut 111 connected by a swivel connector 112 to the valve body 17. A counterweight 113 is secured to a lever arm 113a extending laterally from nut 111.

Figure 9:
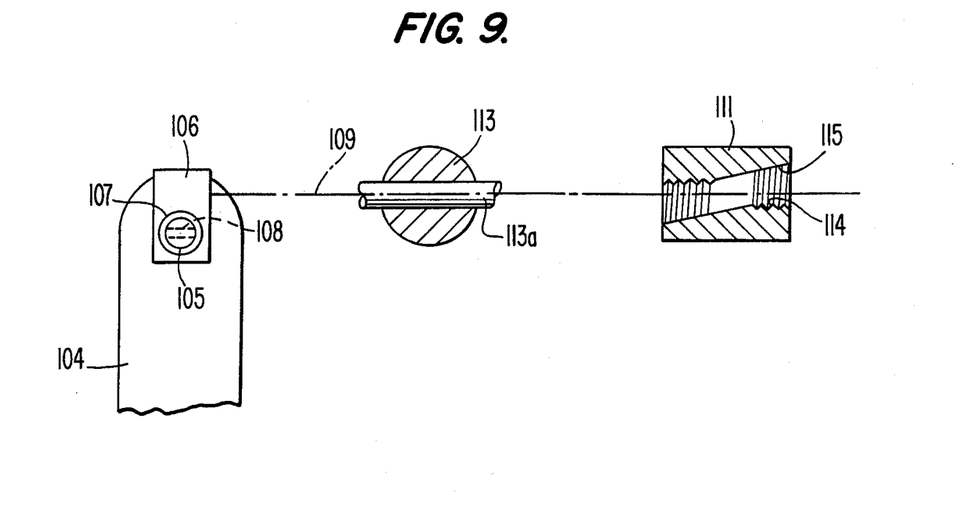
FIGS. 9 and 10 are fragmentary detail views, partly in section, illustrating the manual operation of the valve.
Figure 10:
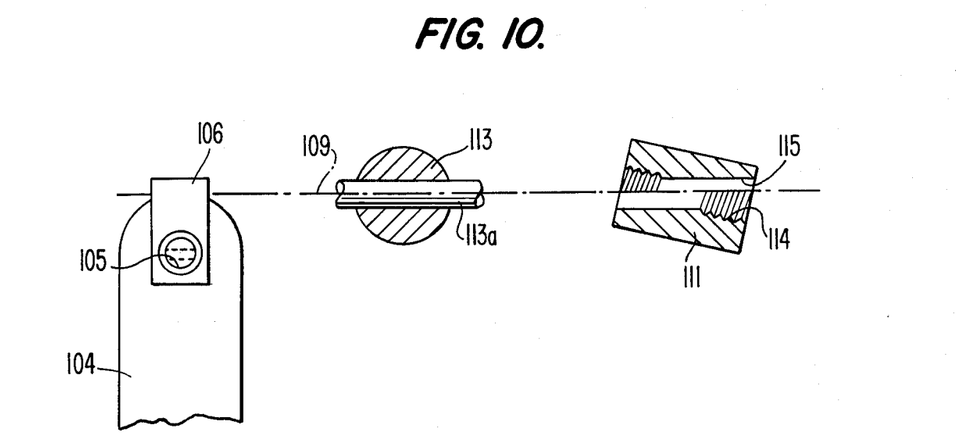

To provide for quick adjustment of the rod 109 endwise relative to the nut 111, the nut has a first bore 114 (FIGS. 9 and 10) that is threaded and a second bore 115 that is smooth and at an angle relative to the axis of the bore 114, and of a diameter large enough to receive the threaded portion of the rod 109 for endwise movement freely therein. The counterweight 113 imposes torque on the nut 111 to pivot the nut on the swivel 112 into the position shown in FIG. 9 in which the threaded bore 114 is in engagement with the threaded portion of the rod 109. When the rod 113a is lifted as shown in FIG. 10, the nut 111 is pivoted so that the threads of the threaded bore 114 are out of engagement with the rod 109. Thus, when the rod 113a is lifted, it is free to slide endwise of the nut 111 to provide for a quick adjustment of the cam plate 101 approximately to the desired position. When the rod is permitted to drop, the threads of the bore 114 again engage the threads of the rod 109 to lock the rod 109 against endwise sliding movement relative to the nut 111 and to provide for a fine adjustment of the rod by turning the handle 110 and thus rotating the same relative to the nut.

The cam plate 101 has a radial stop edge 116 (FIG. 3) adapted to cooperate with a spring plunger 117 on the side wall 40 of the valve gate 32 as the valve gate is rotated relative to the cam plate 101. The spring plunger 117 includes a body 118 (FIG. 4) having one end formed with threads that are threaded into a nut 119 secured to the side wall 40 of the valve gate 32 and held by a lock nut 120. The body 118 is provided with a counterbore 121 inwardly from the threaded end thereof that terminates short of the opposite end thereof to provide a shoulder 122. A plunger 123 extends through the counterbore 121 and a coaxial bore in the end of the body 118, the plunger 123 being surrounded by a compression spring 124 that is compressed between the shoulder 122 and a collar 125 secured to the plunger.

Outwardly of the body 118, the plunger has a handle 126 bent at a right angle to the axis of the plunger and adapted to slide endwise of the free end of the body 118 in a slot 127. The plunger 123 is adapted to be withdrawn by the handle 126 against the action of the spring 124 and to be turned to move the handle 126 into a position overlying the end of the body 118 to hold the plunger 123 in its retracted position—the end of the body 118 being provided with a groove 128 to hold the handle 126 releasably from turning and thus to prevent accidental release from its retracted position.

When the plunger 123 is withdrawn to unseat the handle 126 from the groove 128, and turned to align the handle with the slot 127 and released, the spring 124 moves the plunger forward toward and into engagement with the cam plate 101. The movable valve gate 32 is then moved relative to the bottom plate 30 of the valve body 17 by pulling on the handle 61—counter-clockwise as seen in FIG. 1—until the end of the plunger 123 sliding along the cam plate 101, passes the edge 116. The spring 124 then moves the end of the plunger 123 behind the edge 116 to hold the valve gate 32 against moving in the clockwise direction as seen in FIG. 3—to hold the valve gate in the opened position against the bias of the counterweight 60.

For automatic operation, the cam plate 101 is provided with an "auto" position which is beyond the one hundred percent open position so that the plunger 117 will not pass beyond the edge 116 even if its inadvertently released from its retracted position. At the same time, the rod 109 is centered relative to the valve body 17 in a "store" position where it is least apt to constitute an obstruction or to be damaged.

In manual operation, the cam plate 101 is first positioned for the desired opening of the valve gate 32. The plunger 117 is then released from its retracted position and the valve gate 32 is pulled by the handle 61 to open the valve gate. When the plunger 117 passes beyond the edge 116, the handle 61 is released while the valve gate 32 remains in its open position against the bias of the counterweight 60. To close the valve, the plunger 117 is pulled to its retracted position to release the gate valve 32, which can then be moved to its closed position by the counterweight 60.

The system is thus adapted to be operated in the same manner as existing manual systems—that is, after each valve is set up for the proper valve opening by adjustment of the plates 101, the operator will open the valve of the first silo to be used in the mix, and walking along the belt at belt speed, will open the valve of each successive silo used in the mix as the beginning point of the first drop is directly beneath the next valve.

Figure 11:
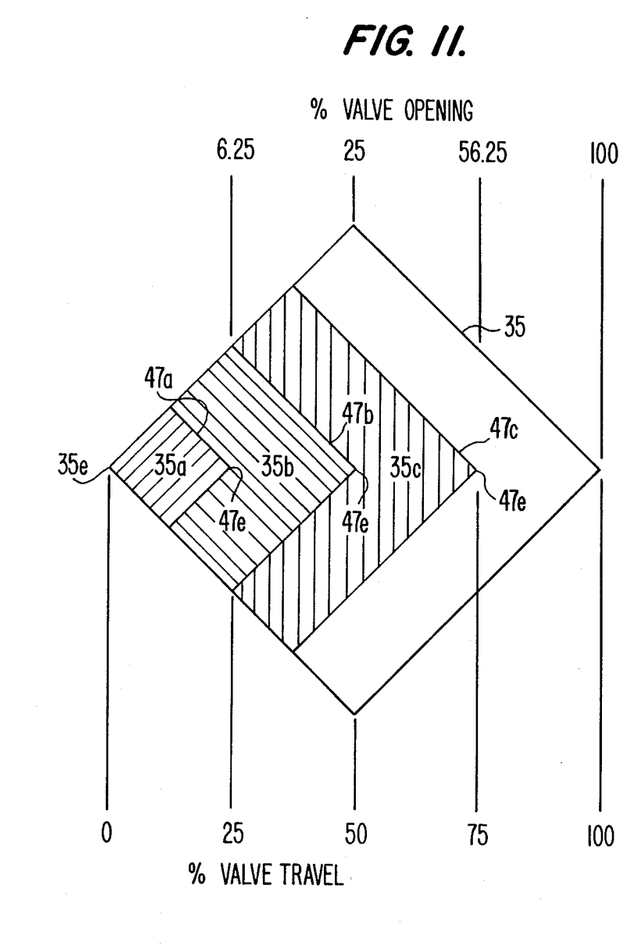
FIG. 11 is a diagramatic view of the valve opening and the valve travel positions of the cooperating orifices in the valve plate and the silos.

One of the principal advantages of the invention is the improved or more accurate control of the flow of the granules over a wide range, which is obtained by using the intersecting diamond shaped orifices 35 and 47. With reference to FIG. 11, there is shown the outline of the stationary orifice 35 with an intersecting portion of the movable orifice 47 shown in three different intermediate positions 47a, 47b and 47c representing respectively twenty-five, fifty and seventy-five percent of travel of the orifice 47 relative to the orifice 35. At one hundred percent travel of the orifice 47 relative to the orifice 35, the orifices of course coincide and the valve is full open. It will also be evident that relative movement between the orifices 35 and 47 occurs along a line extending from the trailing corner 35e of the orifice 35 to its opposite or leading corner, with the line from the leading edge 47e of the orifice 47 to its opposite or trailing corner moving substantially along the same line.

Figure 12:
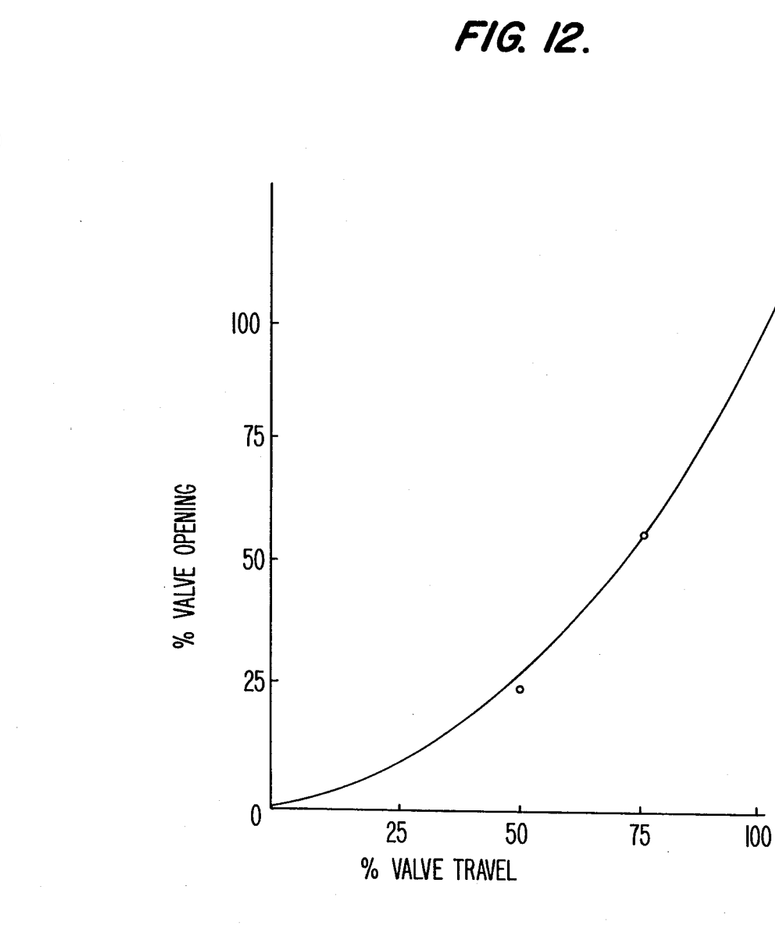
FIG. 12 is a graph showing the valve opening relative to the travel of the valve plate.

As shown at 47a, with twenty-five percent valve travel, the orifices 35 and 47 overlap in the hatched area 35a which represent one sixteenth of the area of the orifices—or 6.25% valve opening. At fifty percent valve travel as shown at 47b, the orifices overlap in the hatched area 35a plus the reverse hatched area 35b, which represents seventy-five percent valve travel, the orifices overlap in the areas 35a and 35b plus the vertically lined area 35c, which represents nine sixteenth of the potential orifice area—or $56\frac{1}{4}\%$ valve opening. At one hundred percent valve travel, the orifices overlap completely and the valve opening is 100%. Accordingly, it will be seen that the valve opening is a function of the square of the percent of valve travel. FIG. 12 is a graph of the valve opening percentage relative to valve travel.

The intersecting diamond shaped orifices thus provide significant control in the lower values of valve travel. Control in this area is important for example in controlling the flow of granules under different operating conditions or with granules having different flow characteristics. Granules may be of minerals having different frictional characteristics so that with granules of two different materials of the same size they may flow at different rates through the same openings. The granules may also be freshly oiled and have different flow characteristics from the same material that was oiled sometime earlier and has dried, was oiled more heavily or was not oiled as much. To compensate for the different flow characteristics of the different granules, the granules are tested to determine their flow characteristics which are used to adjust the opening of the valve gate 32 to compensate for variations from the sample for which the mixing formula was originally devised. For example, if the flow characteristics were determined by calibration tests to require four percent more valve flow area to provide the same volume of flow, the setting of the valve gate 32 is adjusted accordingly—or more particularly, by the square root of the square of the valve travel percent number (which may be for example the desired degrees of valve opening times 200) multiplied by the correction factor (e.g., 1.04).

Another advantage of the present apparatus is that it provide an accurate real-time status of the supply of the granules in each silo, which can be readily calculated from the flow rate and the time of operation. Thus, the operator can be alerted in sufficient time to replenish the supply of granules as the supply in each of the silos is exhausted. The apparatus can also readily maintain a record of the total amount of granules used over a period of time and thus provide an inventory control. Records of the operation may be provided in real time for example by means of display at the controller or can be accumulated and printed out at the completion of a run or other desired time.

As mentioned, the apparatus is adapted to be driven by a programmable controller 130 which may be as illustrated schematically in FIG. 1. The controller 130 is programmed with all of the different product recipes, including the percentage of each of the different color granular material in each mix and the setting of the valve gate as a percent of valve travel to provide the desired percentage of each of the materials based on the flow characteristics of that material as determined by the calibration test.

The controller may also be provided with data indicating the particular silo in which each of the different granules are stored and machine bin in which the mix is to be delivered. Signals from the switch 74 (or 94) that limits the opening motion are fed to the controller 130 as are those from the home position switch 75 (or 95) of the drive pin 55, the proximity switch 80 that indicates that the valve gate 32 is in its closed position and the flow switch 99. The controller 130 also responds to a belt signal S which establishes the point on the belt at which all the granular materials are to begin dropping and to signals for the magnetic pickup 50a of the motor 50.

In a typical cycle, the operator calls up the desired mix on the controller 130 and the controller then, through a look-up table, determines the count for the valve gate position for each of the materials in the mix that will provide the desired flow rate for that material as a percentage of travel of the valve gate 32 from zero to one hundred percent. The values can at the same time be adjusted to accommodate any variations in the flow characteristics from those used in the calibration of the programmed information.

The controller then selects the proper silos and, after sampling all of the proximity switches 80 for all of the silos to ensure that all of the valve gates 32 are properly closed and the belt sensor to ensure that the belt is running, each of the gate valves for the silos that are to be used in the selected mix are preset in sequence by energizing the clutches 53 and operating the motor 50 in reverse for each of the units by the programmed amount. When all of the drives have been preset, all of the motors 50 are driven in the opening direction until their respective home switches are closed, which deenergizes each of the motors in the "ready" mode with the clutches 53 all still energized.

Upon operation of the belt B for a period of time long enough to ensure that the system has been purged of all granules from the previous mix, the motor 50 of the first silo is energized by a belt signal S to drive the valve gate 32 to the open position as determined by the amount that it was preset. Upon completion of the fixed cycle of the motor 50—120°—the switch 54 (or 94) is opened to stop the motor 50. The clutches 53 remain energized and through the irreversibility of the reduction gear unit 51 acts to brake the disc drive 54 and thus hold the valve gate 32 open.

As the point on the belt at which the motor 50 for the first silo was energized approaches the second silo selected for the mix, the belt signal S actuates the motor 50 of the second silo and repeats the opening operation. This is repeated for each of the silos with material to be used in the mix.

As each valve is opened, the flow switch 99 for that valve gate is closed and remains closed so long as granules continue to flow. In the event the flow is interrupted for any reason, the switch 99 opens and the entire system is shutdown. Each of the valve gates is closed by deenergizing the clutches 53, at which time the valve gate is returned to its closed position by the counterweight 60 and the drive disc 54 is returned to its home position by the counterweight 66.

In addition to the flow switch 99, the system can also be shutdown manually or by a timer after the end of the desired run, or by sensors in the event the mixing belt stops or a clutch 53 fails (and the home position switch 75 is thus closed) or there is a power failure or computer failure.

The controller may also be used to indicate the cause in the event of an emergency shutdown.

Having thus described the invention what is claimed is:

1. Apparatus for metering gravity flow of granular material comprising a valve body for receiving granular material from a supply and having an orifice defining an outlet from said valve body, a valve gate mounted on and for movement relative to said valve body and having an orifice for cooperating with the orifice in said valve body to provide graduated metering of granular material through said orifices, valve gate bias means for biasing said valve gate to a closed position relative to said valve body, drive means, means for cyclically actuating said drive means; a drive element for moving said valve gate toward an open position relative to said valve body upon movement of said drive means in a first direction and for moving relative to said valve gate upon movement of said drive means in the opposite direction, clutch means for releasably coupling said drive means to said drive element, means for limiting movement of said drive means in the first direction to a fixed amount upon each actuation thereof, and means for operating said drive means initially in the opposite direction a predetermined amount upon actuation thereof, said predetermined amount being less than or equal to said fixed amount, thereby selectively determining the movement of said valve gate towards its open position upon operation of said drive means through said fixed amount in said first direction.

2. Apparatus in accordance with claim 1 having brake means for retaining said valve gate in the open position against said valve gate bias means when said drive means is inoperative.

3. Apparatus in accordance with claim 2 in which said brake means is released upon deactuation of said clutch means.

4. Apparatus in accordance with claim 3 in which said brake means comprises an irreversible drive mechanism when said drive means is inoperative, and said brake means comprises means for coupling said valve gate to said irreversible drive mechanism.

5. Apparatus in accordance with claim 4 in which said means for coupling said valve gate to said irreversible drive connection comprises said clutch means and said drive element.

6. Apparatus in accordance with claim 1 in which said clutch means couples said drive means to said drive element for holding said valve gate in the open position when said drive means is inoperative, and said valve gate bias means move said valve gate to its closed position upon deactuating said clutch means.

7. Apparatus in accordance with claim 1 having drive element bias means for biasing said drive element to a home position upon releasing said clutch means.

8. Apparatus in accordance with claim 1 having means for moving said drive element to a home position.

9. Apparatus in accordance with claim 8 in which said means for operating said drive means include means for reversing the same at the completion of the predetermined movement in the opposite direction, and means for stopping said drive means in a ready condition when said drive element returns to said home position.

10. Apparatus in accordance with claim 9 having means for reactuating said drive means in said first direction from said ready condition for completing movement thereof for said fixed amount.

11. Apparatus in accordance with claim 1 in which said means for limiting movement of said drive means in the first direction to a fixed amount comprises a rotary element and switch means responding to the rotation of said rotary element, and means for coupling said rotary element to said drive means for movement of said rotary element with said drive means upon movement of said drive means in the first direction and for movement of said drive means relative to said rotary element upon movement of the drive means in the opposite direction.

12. Apparatus in accordance with claim 1 having stop means for positioning said valve gate in the closed position under the action of said valve gate bias means.

13. Apparatus in accordance with claim 12 having means for determining when said valve gate is in its closed position.

14. Apparatus in accordance with claim 1 in which said means for operating said drive means initially in the opposite direction a predetermined amount comprises a programmable controller.

15. Apparatus in accordance with claim 14 in which said programmable controller operates to actuate said clutch means.

16. Apparatus in accordance with claim 1 in which said orifice in said valve body and said valve gate are diamond-shaped and are arranged for movement of the orifice in the said valve gate relative to the orifice in said valve body so that the orifices may overlap, the overlapping area of said orifices determining the amount of valve opening, said relative movement of said orifices being along a line extending from one corner of said orifice in said valve gate to the opposite corner thereof moving substantially along a comparable line extending from one corner of said orifice in the valve body to the opposite corner whereby the valve opening is nonlinear relative to the travel of the valve gate with respect to the valve body.

17. Apparatus in accordance with claim 16 in which said means for operating said drive means initially in the opposite direction a predetermined amount comprises a programmed controller for establishing the open position of said valve gate.

18. A method for metering the flow of granular material through a fixed orifice and a moveable orifice adapted to be moved between an open and a closed position relative to said fixed orifice and to define an outlet for the granular material in the overlapping areas of said orifices, said method comprising the steps of providing a drive for said moveable orifice for driving the same towards said open position and for movement of said drive relative to said moveable orifice in the opposite direction, moving said drive initially a predetermined amount in the opposite direction from a home position, reversing said drive to return the same to said home position, thereafter actuating said drive to move said orifice toward the open position an amount equal to a fixed amount less said predetermined amount, and biasing said drive into said home position and biasing said moveable orifice to its closed position, maintaining said drive coupled to said moveable orifice in the open position to hold the same against said bias, and deenergizing said drive to provide for movement of said drive to its home position and of said movable orifice to its closed position under the action of said biases.

* * * * *